US012623951B2

(12) United States Patent
Blyum et al.

(10) Patent No.: US 12,623,951 B2
(45) Date of Patent: May 12, 2026

(54) METHOD OF MANUFACTURING AN OPTICAL FIBER AND PRODUCTION SYSTEM THEREFOR

(71) Applicant: CORNING INCORPORATED, Corning, NY (US)

(72) Inventors: Maxim Evgenyevich Blyum, Saint Petersburg (RU); Elena Alekseevna Chizhova-Notkina, Valbonne (FR); Nikolay Anatolyevich Panin, Wilmington, NC (US)

(73) Assignee: CORNING INCORPORATED, Corning, NY (US)

( * ) Notice: Subject to any disclaimer, the term of this patent is extended or adjusted under 35 U.S.C. 154(b) by 394 days.

(21) Appl. No.: 17/899,061

(22) Filed: Aug. 30, 2022

(65) Prior Publication Data

US 2023/0075419 A1 Mar. 9, 2023

Related U.S. Application Data

(60) Provisional application No. 63/240,487, filed on Sep. 3, 2021.

(51) Int. Cl.
*C03B 37/027* (2006.01)
*C03B 37/15* (2006.01)

(52) U.S. Cl.
CPC ........ *C03B 37/02727* (2013.01); *C03B 37/15* (2013.01); *C03B 2205/56* (2013.01)

(58) Field of Classification Search
None
See application file for complete search history.

(56) References Cited

U.S. PATENT DOCUMENTS

| 10,427,969 B2 * | 10/2019 | Imase | ................. | C03B 37/0253 |
| 2018/0246274 A1 * | 8/2018 | Billings | ............... | C03B 37/029 |

FOREIGN PATENT DOCUMENTS

| DE | 4215475 A1 | 11/1993 | |
| JP | H01192749 A * | 8/1989 | ....... C03B 37/02718 |
| JP | 2547806 B2 * | 10/1996 | ....... C03B 37/02718 |
| JP | H11116284 A * | 4/1999 | ............... G02B 6/44 |
| JP | H11171582 A * | 6/1999 | ....... C03B 37/02718 |
| JP | 2000075146 A * | 3/2000 | |
| JP | 2005298242 A * | 10/2005 | ....... C03B 37/02718 |

* cited by examiner

*Primary Examiner* — Queenie S Dehghan
(74) *Attorney, Agent, or Firm* — Yiqun Zhao

(57) ABSTRACT

A method of manufacturing optical fiber in an optical fiber production system is provided. The method includes providing a draw furnace operatively coupled to a slow cooling device along a draw pathway, drawing the optical fiber from an optical fiber preform in the draw furnace and along the draw pathway, heat treating the optical fiber in the slow cooling device positioned along the draw pathway, the slow cooling device comprising an inlet, an outlet, and a process tube extending between the inlet and the outlet, and selecting an opening size of an outlet nozzle operatively coupled to the outlet based on a draw speed of the optical fiber.

18 Claims, 4 Drawing Sheets

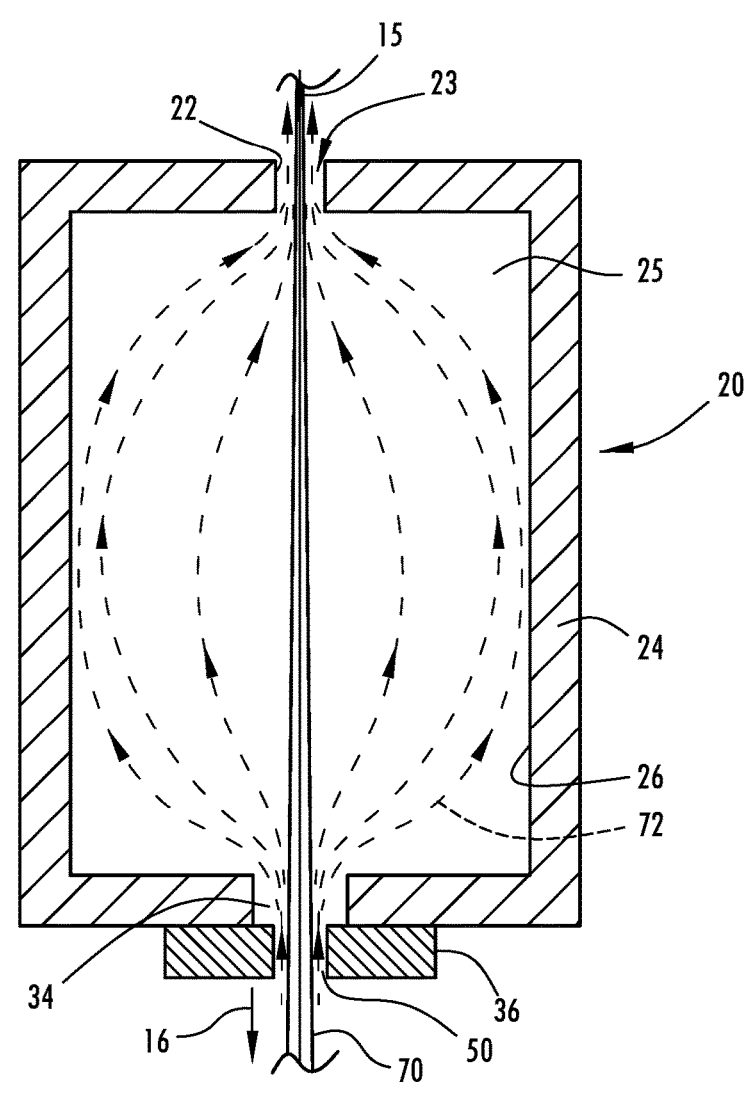
FIGURE 2
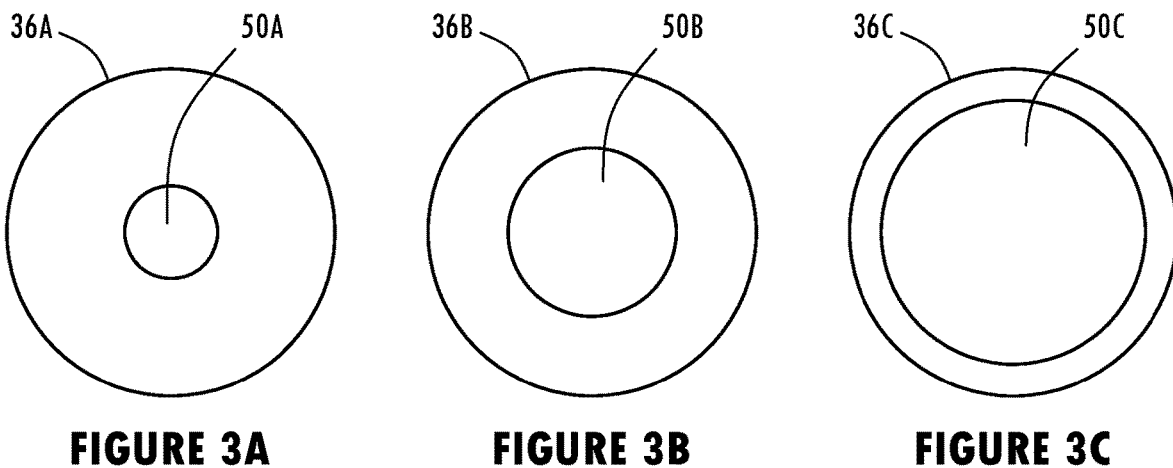
FIGURE 3A          FIGURE 3B          FIGURE 3C

METHOD OF MANUFACTURING AN OPTICAL FIBER AND PRODUCTION SYSTEM THEREFOR

This Application claims the benefit of priority to U.S. Provisional Patent Application Ser. No. 63/240,487 filed on Sep. 3, 2021, the content of which is relied upon and incorporated herein by reference in its entirety.

BACKGROUND OF THE DISCLOSURE

The present disclosure generally relates to an apparatus and methods for producing optical fibers, and more particularly relates to controlling the air flow through a slow cooling device, e.g., an annealing furnace, during an optical fiber production operation.

Optical fibers are generally manufactured in an optical fiber production system and a method of manufacture in such a system typically includes drawing an optical fiber downward from a draw furnace along a path through multiple stages of production in an optical fiber draw tower. The optical fiber drawn from the draw furnace may be cooled in an annealing furnace which operates as a slow cooling device to cool the optical fiber within a controlled cooling range to minimize fictive temperature and Rayleigh scattering. When traversing the annealing furnace, gas flow patterns within the annealing furnace may alter properties of the optical fiber. It may be desirable to provide for an optical fiber manufacturing process and production system that achieves enhanced air flow at various fiber draw speeds.

SUMMARY OF THE DISCLOSURE

In accordance with one embodiment, a method of manufacturing optical fiber in an optical fiber production system is provided. The method includes the steps of providing a draw furnace operatively coupled to a slow cooling device along a draw pathway, drawing the optical fiber from an optical fiber preform in the draw furnace and along the draw pathway, heat treating the optical fiber in the slow cooling device positioned along the draw pathway, the slow cooling device comprising an inlet, an outlet, and a process tube extending between the inlet and the outlet, and selecting an opening size of an outlet nozzle operatively coupled to the outlet based on a draw speed of the optical fiber.

In accordance with another embodiment, an optical fiber production system is provided. The optical fiber production system includes a draw furnace configured to draw an optical fiber from an optical preform along a draw pathway extending from the draw furnace, and a slow cooling device positioned along the draw pathway. The slow cooling device includes an inlet, an outlet, and a process tube extending between the inlet and the outlet. The optical fiber production system also includes an adjustable outlet nozzle located proximate to the outlet, wherein the adjustable outlet nozzle has an outlet opening size adjusted based on draw speed of the optical fiber, and a fiber collection unit positioned along with draw pathway.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 2 is a schematic diagram of a process tube of the annealing furnace having an outlet nozzle at the bottom end thereof, according to another example;

FIG. 3A is a top view of a first selectable outlet nozzle having a first size opening configured for use at a first fiber draw speed;

FIG. 3B is a top view of a second selectable outlet nozzle having a different second size opening configured for use at a second fiber draw speed;

FIG. 3C is a top view of a third selectable outlet nozzle having a different third size opening configured for use at a third fiber draw speed;

DETAILED DESCRIPTION

Figure 1:
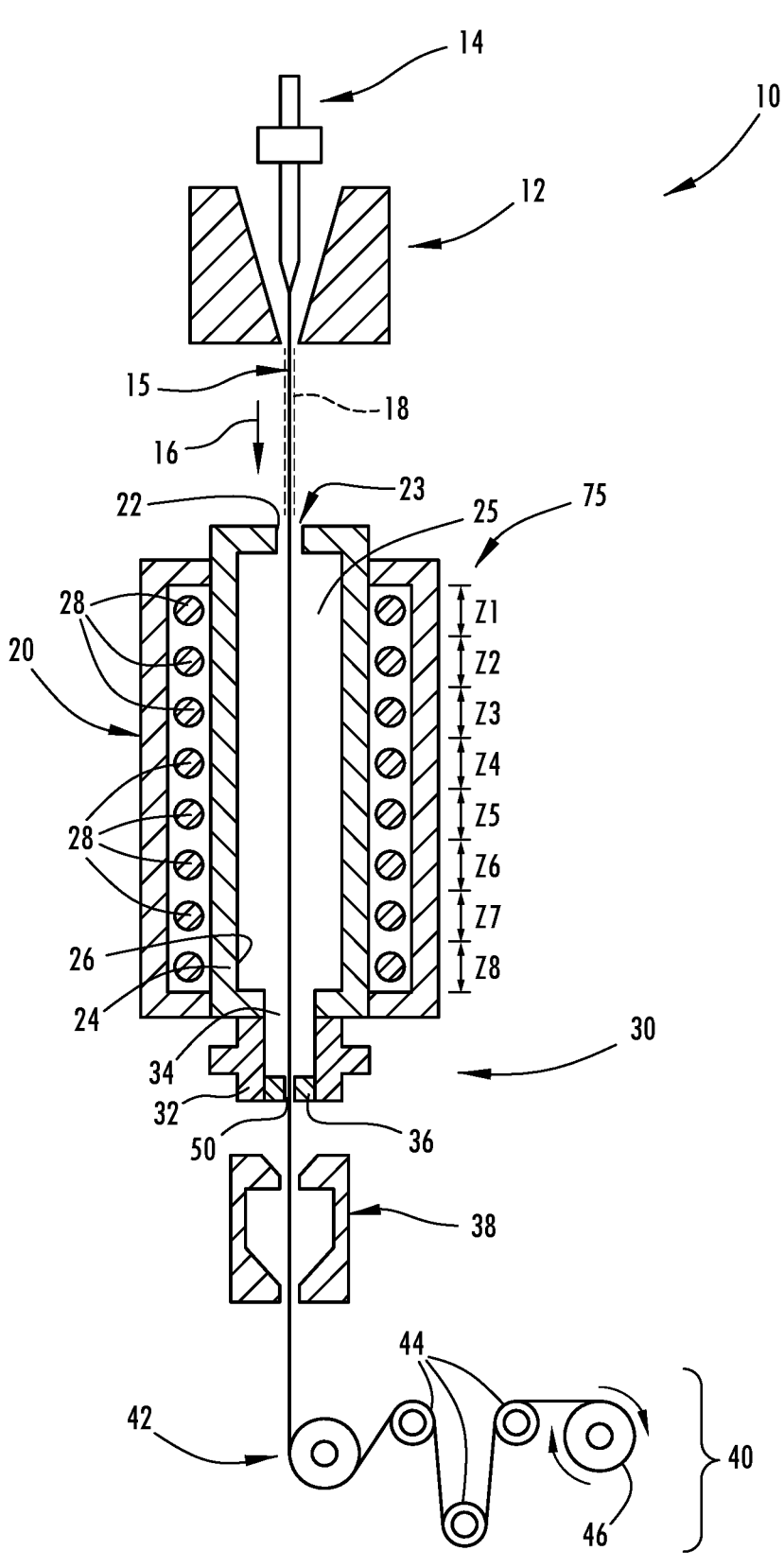
FIG. 1 is a schematic diagram of an optical fiber production system configured with an annealing furnace having a gas distribution assembly and an outlet nozzle, according to one embodiment.

Reference will now be made in detail to embodiments of methods and systems for producing optical fibers, examples of which are illustrated in the accompanying drawings. Whenever possible, the same reference numerals will be used throughout the drawings to refer to the same or like parts. More specifically, the methods and systems described herein relate to production of optical fibers, which includes drawing an optical fiber from an optical preform in a draw furnace and heat treating to controllably cool the optical fiber in a slow cooling device such as an annealing furnace while allowing air flow within a process tube of the annealing furnace extending through a select size outlet nozzle. As such, the embodiments shown and described herein disclose an improved optical fiber production system having a select size outlet nozzle proximate an outlet of the annealing furnace to control air flow entering the annealing furnace to thereby produce uniformly dense optical fibers that exhibit low fiber attenuation. Various embodiments of methods and systems for producing optical fibers will be described herein with specific reference to the appended drawings.

Referring now to FIG. 1, one embodiment of an optical fiber production system 10 configured to produce an optical fiber 15 is schematically depicted. The optical fiber production system 10 comprises a draw furnace 12, a slow cooling heat treatment device embodied as an annealing furnace 20, an optional gas distribution assembly 30, a fiber collection unit 40, and a fiber coating unit 38. As depicted in FIG. 1, a draw pathway 18 extends from the draw furnace 12 to the fiber collection unit 40 and is the pathway along which an optical fiber 15 travels during production, for example, in a draw direction 16. As depicted in FIG. 1, an optical fiber preform 14 is placed in the draw furnace 12. The optical fiber preform 14 may be constructed of any glass or material suitable for the manufacture of optical fibers.

In operation, the draw furnace 12 may heat the optical fiber preform 14 to a temperature such as about 1,900° C.-2,100° C. such that the optical fiber 15 may be drawn from the optical fiber preform 14. The draw furnace 12 may be oriented along the draw pathway 16, which may be a vertical pathway, such that the optical fiber 15 drawn from the optical fiber preform 14 exits the draw furnace 12 along the draw pathway 18 in the draw direction 16, which may be a downward direction. By orienting the draw furnace 12 in a vertical direction, the optical fiber 15 may be drawn from the optical fiber preform 14 by the weight of the optical fiber preform 14 as the optical fiber preform 14 softens due to the temperature of the draw furnace 12 and, in some embodiments, by tension applied to the optical fiber 15, and thereby applied to the optical fiber preform 14, by the fiber collection unit 40.

Referring now to FIGS. 1 and 2, once the optical fiber 15 is drawn from the optical fiber preform 14 and exits the draw furnace 12, the optical fiber 15 enters the annealing furnace 20. The annealing furnace 20 is a slow cooling device that heat treats the optical fiber 15 by cooling the optical fiber 15 at selected temperatures. The annealing furnace 20 comprises a furnace inlet 23 and a furnace outlet 34. The draw pathway 18 extends through the annealing furnace 20, for example, through the furnace inlet 23 and the furnace outlet 34. The annealing furnace 20 includes a process tube 24 having a process tube wall 26 bounding a process tube cavity 25. The process tube 24 may have a length of about 8 to 9 meters, according to one example. In operation, the optical fiber 15 drawn from the optical fiber preform 14 may traverse the annealing furnace 20, traveling from the furnace inlet 23, through the process tube 24 to the furnace outlet 34. While not intending to be limited by theory, passing the optical fiber 15 through the annealing furnace 20 to slow the optical fiber cooling rate (when compared to the cooling rate of the optical fiber 15 in the external atmosphere) may improve the density uniformity in the optical fiber 15. Further, a uniformly dense optical fiber 15 may have reduced attenuation due to decreased Rayleigh scattering when the optical fiber 15 is used as a light waveguide.

As depicted in FIG. 1, the annealing furnace 20 may further comprise a furnace inlet channel 22 and a furnace outlet channel 32. The furnace inlet channel 22 is fluidly coupled to the furnace inlet 23 such that the optical fiber 15 traverses the furnace inlet channel 22 before entering the process tube 24 via the furnace inlet 23. Further, the furnace inlet channel 22 extends from the furnace inlet 23 away from the process tube 24 and may comprise a length of from about ¼ inch to about 5 inch, for example, ½ inch, 1 inch, 1.5 inch, 2 inch, 2.5 inch, 3 inch, 3.5 inch, 4 inch, 4.5 inch, or the like. Further, the furnace inlet channel 22 may comprise a cross-sectional dimension (e.g., diameter) of from about ⅛ inch to about 1 inch, for example, about ¼ inch, ⅜ inch, ⅓ inch, ½ inch, ⅝ inch, ⅔ inch, ¾ inch, ⅛ inch, or the like. In some embodiments, the furnace inlet channel 22 may be physically coupled to the process tube 24 at the furnace inlet 23 or integral with the process tube 24. Further, the furnace inlet channel 22 may comprise an insulative material to minimize the effect of the external atmosphere on the temperature within the process tube 24.

Referring still to FIG. 1, the furnace outlet channel 32 is fluidly coupled to the furnace outlet 34 and extends from the furnace outlet 34 away from the process tube 24 such that the optical fiber 15 traverses the furnace outlet channel 32 after exiting the process tube 24 via the furnace outlet 34. The furnace outlet channel 32 may be coupled to the process tube 24 at the furnace outlet 34 or integral with the process tube 24. In some embodiments, the furnace outlet channel 32 comprises an insulative material to minimize the effect of the external atmosphere on the temperature within the process tube 24. Further, the diameter of the furnace inlet channel 22 and the furnace outlet channel 32 may be less than a maximum diameter of the process tube wall 26 of the process tube 24.

As shown in FIG. 1, the annealing furnace 20 further comprises a plurality of heating zones 75 positioned in a stacked arrangement between the furnace inlet 23 and the furnace outlet 34. Each heating zone 75 comprises at least one heating element 28 thermally coupled to the process tube wall 26. The heating elements 28 may be individually controllable to output different levels of heat, such that, in some embodiments, the heating zones 75 may each comprise a different temperature. In the embodiment depicted in FIG. 1, the annealing furnace 20 comprises eight (8) heating zones however, it should be understood that any number of heating zones 75 are contemplated.

In operation, the heating elements 28 may generate a temperature within each heating zone 75 of from about 800° C. to about 1500° C., according to one example. In embodiments, the heating zone 75 nearest the furnace inlet 23 (e.g., a first heating zone $Z_1$) may comprise a higher temperature than the remaining heating zones 75 and the heating zone nearest the furnace outlet 34 (e.g., an eighth heating zone $Z_8$) may comprise a lower temperature than the remaining heating zones 75. In other words, the temperature within the process tube 24 decreases along the draw pathway 18 from the furnace inlet 23 to the furnace outlet 34 such that the temperature of the optical fiber 15 decreases as the optical fiber 15 traverses the process tube 24 between the furnace inlet 23 and the furnace outlet 34 in the draw direction 16, facilitating slow cooling heat treatment of the optical fiber 15. In other embodiments, the temperature of the heating zones 75 may not necessarily decrease along the draw pathway 18 in the draw direction 16, however, in each embodiment, the temperature of the optical fiber 15 decreases as the optical fiber 15 traverses the process tube 24 between the furnace inlet 23 and the furnace outlet 34 in the draw direction 16.

The uncoated optical fiber 15 exits the annealing furnace 20 via the furnace outlet 34 and may pass through an annealing furnace outlet channel 32 of a gas distribution assembly 30 as shown in FIG. 1, according to one embodiment. It should be appreciated that the optical fiber production system 10 may or may not employ a gas distribution assembly. The gas distribution assembly 30 which is shown coupled to the furnace outlet may be structurally configured to induce gas flow from the gas distribution assembly 30 into the process tube 24 such that gas flows within the process tube 24 in an up flow direction. One example of a gas distribution assembly is disclosed in U.S. Patent Application Publication No. 2018/0246274 which is hereby incorporated herein by reference. An outlet nozzle 36 is operatively coupled to the furnace outlet 34. In an embodiment employing the gas distribution assembly 30, the outlet nozzle 36 may be located within or proximate to the gas distribution assembly 30 such as within or proximate to the outlet channel 32 of the gas distribution assembly 30. The outlet nozzle 36 may be selected to include an outlet opening size based on the draw speed of the optical fiber 15. In one embodiment, the outlet nozzle 36 may be selected from a plurality of outlet nozzles having different size openings to accommodate different optical fiber draw speeds. According to another embodiment, the outlet nozzle may be an adjustable outlet nozzle 36 that may be controlled to adjust the size of the opening based on the draw speed of the optical fiber 15.

After annealing the optical fiber 15 in the annealing furnace 20 and exiting the furnace outlet 34 through the outlet nozzle 36, the uncoated optical fiber 15 may be coated with a fiber coating unit 38. After coating the optical fiber in the fiber coating unit 38, the optical fiber 15 may be wound onto a fiber storage spool 46 with the fiber collection unit 40. The fiber collection unit 40 may utilize one or more drawing mechanisms 44 and tension pulleys 42 to facilitate winding the optical fiber 15 onto the fiber storage spool 46. The tensioning pulleys 42 may provide necessary tension to the optical fiber 15 as the optical fiber 15 is drawn through the optical fiber production system 10. Accordingly, the fiber collection unit 40 may directly contact the coated optical fiber 15 in order to both wind the optical fiber 15 onto the fiber storage spool 46 as well as to provide the desired tension on the optical fiber 15 as the optical fiber 15 is drawn along the draw pathway 18, for example, through the draw furnace 12, the annealing furnace 20, the gas distribution assembly 30, outlet nozzle 36, and the fiber coating unit 38.

Referring to FIG. 2, a process tube 24 of an annealing furnace 20 is shown having an outlet nozzle 36 coupled directly to the furnace outlet 34 at the bottom end of the process tube 24 without the presence of a gas distribution assembly, according to another embodiment. In either embodiment, the outlet nozzle 36 is operatively, fluidly coupled to the furnace outlet 34 and has an outlet opening size selected based on the draw speed of the optical fiber 14 as the optical fiber 14 is drawn along draw pathway 18.

Referring still to FIG. 2, as the optical fiber 15 traverses the process tube 24 along the draw pathway 18, a gas boundary layer 70 is typically generated around the optical fiber 15 within the process tube cavity 25 and comprises gas flowing primarily in the draw direction 16. The gas forming the boundary layer may include ambient air and other gases. The gas boundary layer 70 extends radially from the optical fiber 15 toward the process tube wall 26, terminates at a gas layer interface, and comprises a gas boundary layer thickness. While not intending to be limited by theory, the gas boundary layer 70 is formed from drag generated by motion of the optical fiber 15 in the draw direction 16.

As depicted in FIG. 2, the furnace inlet channel 23 comprises a diameter greater than a cross-sectional diameter of the gas boundary layer 70 (e.g., greater than twice the gas boundary layer thickness), for example, from about 5 mm to about 20 mm, and is about 10 mm, according to one example. Without intending to be limited by theory, having a furnace inlet channel 23 with a diameter greater than the cross-sectional diameter of the gas boundary layer 14 to allow heated air to exit the annealing furnace 20 and cooling air to enter the annealing furnace 20 may limit the amount of turbulent gas flow within the process tube 24, for example, may limit turbulent gas flow in the draw direction 16 within the gas boundary layer 70.

During the draw of the optical fiber 15, the optical fiber 15 is moving in the draw direction 16 at significant speeds which create the air boundary layer 70 that moves together with the optical fiber 15 as the optical fiber 15 passes through the annealing furnace 20 and exits the furnace outlet 34 and outlet nozzle 36. The higher the draw speed of the optical fiber 15, the thicker the boundary layer 70 becomes. When the fiber draw speed is relatively low (e.g., less than 55 m/s), the boundary layer 70 is relatively thin and the thickness or diameter of the boundary layer 70 is smaller than the diameter of the bottom outlet nozzle 36 opening. When the boundary layer 70 is relatively smaller than the outlet of the outlet nozzle 36, cooler air from below the nozzle 36 can easily enter the annealing furnace 20 from the bottom side and flow upwards in a direction opposite the draw path as seen by air flow path 72. After the cooling air flows into the annealing furnace 20, the cooling air heats up and starts flowing upwards within the process tube 24 until it exits the furnace inlet 32 at the top of the process tube 24. A driving force for this cooling air flow path 72 is a pressure difference between the furnace outlet 34 and furnace inlet 23. Since the cooling air is flowing outside the annealing furnace 20 from the top furnace inlet 23, the pressure in this region exceeds room pressure. It should be appreciated that the air flow on air flow path 72 may likewise be applied through the gas distribution assembly 30 shown in FIG. 1, according to the first embodiment. When the draw speed of the optical fiber 15 increases e.g., 55 m/s or greater, the boundary layer 70 becomes thicker and likewise increases. If the outlet nozzle 36 remains at the same diameter, at some point an increase in draw speed of the optical fiber 15 may result in the boundary layer 70 becoming thicker such that the bottom outlet nozzle 36 may become plugged, at least periodically, which may result in an asymmetric non-stationary flow pattern that may cause fiber vibration. Periodic bottom nozzle plugging may lead to lower pressure inside the annealing furnace 20 and lower pressure difference across the top nozzle and, consequently, less intense upward cooling air flow through the furnace inlet 23. In order to prevent the boundary layer 70 from plugging the outlet nozzle 36 and causing fiber vibration, the outlet nozzle 36 is selected or controlled to provide a selected opening size based on the draw speed of the optical fiber 15.

The ratio of the pressure forces to viscous forces can be used to describe the plugging of the outlet nozzle 36 due to the boundary layer. The pressure below the outlet nozzle 36 is generally higher than inside the annealing furnace 20 and the pressure forces tend to push the cooler air into the annealing furnace 20 through the bottom outlet nozzle 36. On the other hand, the moving optical fiber 15 is creating the downwards viscous flow that may cause plugging of the outlet nozzle 36 which may occur in FIG. 6, for example. As a result, when the ratio of pressure to viscous forces is relatively high, the pressure difference may overpower the viscous flow and the air is flowing up through the bottom outlet nozzle 36. In the opposite case, when this ratio is low, the viscous forces overcome the pressure and the bottom outlet nozzle 36 may become plugged.

Figures 6, 7:
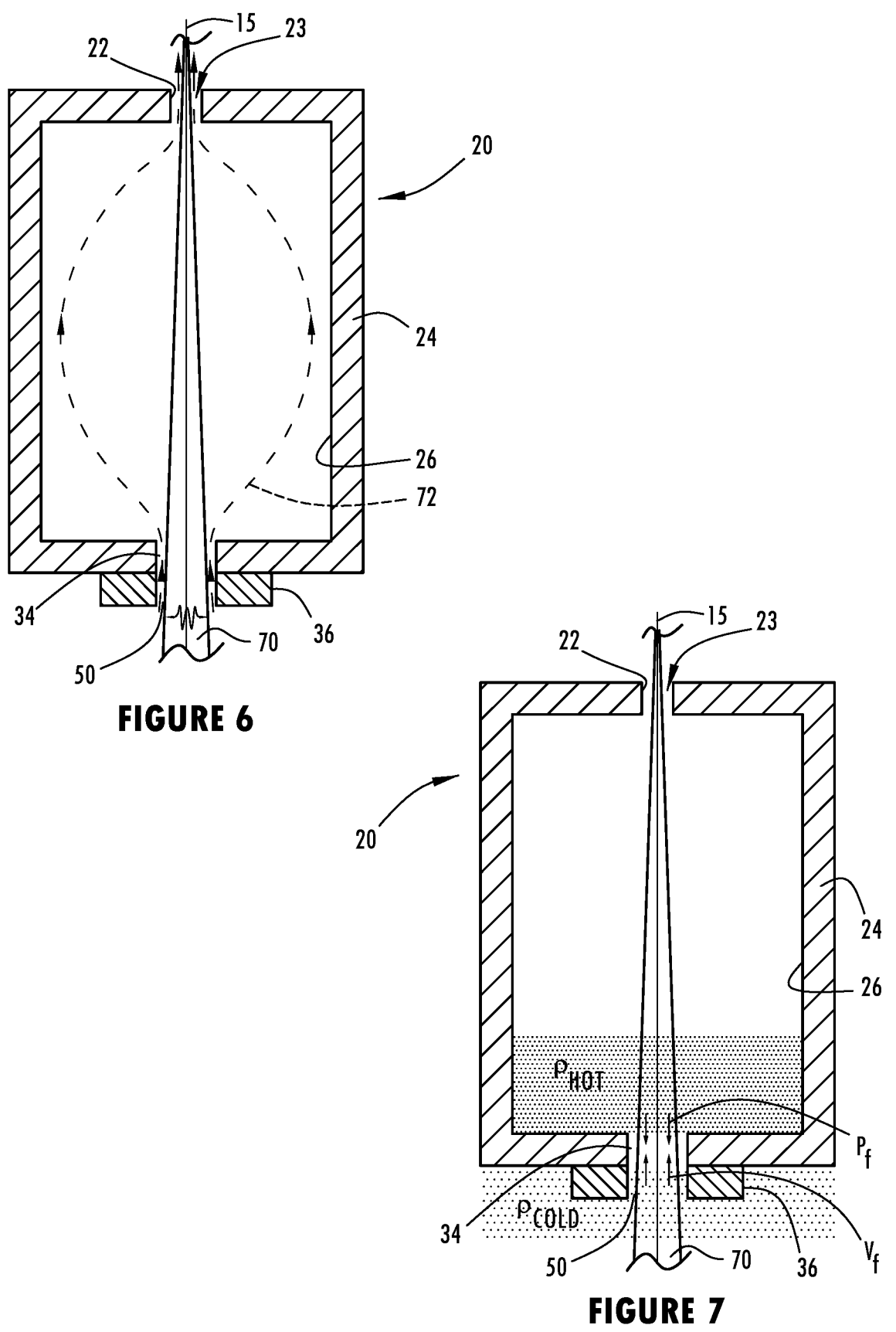
FIG. 6 is a schematic diagram of the annealing furnace further illustrating plugging of the furnace outlet with the boundary layer of air.
FIG. 7 is a schematic diagram of the annealing furnace further illustrating the pressure and viscous forces experienced during fiber production.

One example of pressure forces $P_f$ and viscous forces $V_f$ is illustrated in the FIG. 7. The ratio of pressure forces $P_f$ viscous forces $V_f$ can be estimated as the product of the Reynolds number and Euler number. Since the Reynolds number (Re) indicates the ratio of the inertial forces $V_f$ viscous forces and Euler number (Eu) shows the ratio of the pressure forces $P_f$ to inertial forces, the product of EuRe may indicate the ratio of the pressure forces $P_f$ to viscous forces $V_f$ as shown in the following equation:

$$EuRe = \frac{\Delta P}{\rho u^2}\frac{\rho ur}{\mu} = \frac{r\Delta P}{u\mu}$$

where $\Delta P$—pressure difference between the outside and the inside of the bottom nozzle; $\rho$—gas (air) density; u—gas speed (draw speed); r—nozzle radius; $\mu$—gas dynamic viscosity.

The pressure difference can be estimated using the Pascal's law as follows:

$$\Delta P = \rho_{cold}gh\rho_{hot}gh = (\rho_{cold} - \rho_{hot})gh$$

where $\rho_{cold}$— air density below the annealing furnace bottom; $\rho_{hot}$— air density in the bottom annealing furnace zone; g—gravitational constant; h—annealing furnace height.

Finally, the ratio of the pressure forces to the viscous forces is shown below:

$$EuRe = \frac{rgh(\rho_{cold} - \rho_{hot})}{u\mu}$$

Detailed modeling has shown that fiber production with sufficient cooling gas entering the annealing furnace and no vibration takes place at EuRe values above ~250 and that plugging of the outlet nozzle and associated disadvantages may occur at EuRe below ~200. Between 200 and 250 there may be a transition region where plugging of the outlet nozzle may or may not occur.

Referring to FIGS. 3A-3C, three selectable output nozzles labeled first outlet nozzle 36A, second outlet nozzle 36B, and third outlet nozzle 36C are illustrated as a set of selectable outlet nozzles that may be operatively coupled, e.g., fluidly coupled, to the furnace outlet 34 for use at different fiber draw speeds according to one embodiment. The first outlet nozzle 36A has a cylindrical first size opening 50A that is smaller than the other outlet nozzles. The first outlet nozzle 36A may be used for low fiber draw speeds of the optical fiber such as fiber draw speeds at or below 55 meters per second, according to one example. The second outlet nozzle 36B has a cylindrical second size opening 50B greater than the first size opening 50A of the first outlet nozzle 36A. The second outlet nozzle 36B may be selected and used for intermediate fiber draw speeds such as in the range of 55 meters per second to 70 meters per second, according to one example. The third outlet nozzle 36C is shown having a cylindrical third size opening 50C that is larger than the first and second openings 50A and 50B of the respective first and second outlet nozzles 36A and 36B. The third outlet nozzle 36C may be selected for use at high fiber draw speeds such as those at or above 70 meters per second, according to one example. Accordingly, the annealing furnace 20 may be operatively coupled with an outlet nozzle 36 having a desired size based on the draw speed of the optical fiber 15. The selected outlet nozzle may be installed on the fiber production system 10 and used for optical fiber production within a desired draw speed range and may be changed out with a different outlet nozzle having a different size opening to accommodate changes to the fiber draw speed, according to this embodiment.

According to one example, the first, second and third outlet nozzles 36A-36C may have a circular opening size diameter of about 5-8 mm, more specifically, the first outlet nozzle 36A may have an opening diameter of about 5 mm for a draw speed of 50 m/s, the second outlet nozzle 36B may have an opening diameter of about 6.5 mm for a draw speed of 60 m/s, and the third outlet nozzle 36C may have an opening diameter of about 8 mm for a draw speed of 70 m/s. It should be appreciated that two or more selectable outlet nozzles may be employed to select from use in the optical fiber production system 10.

Figure 4:
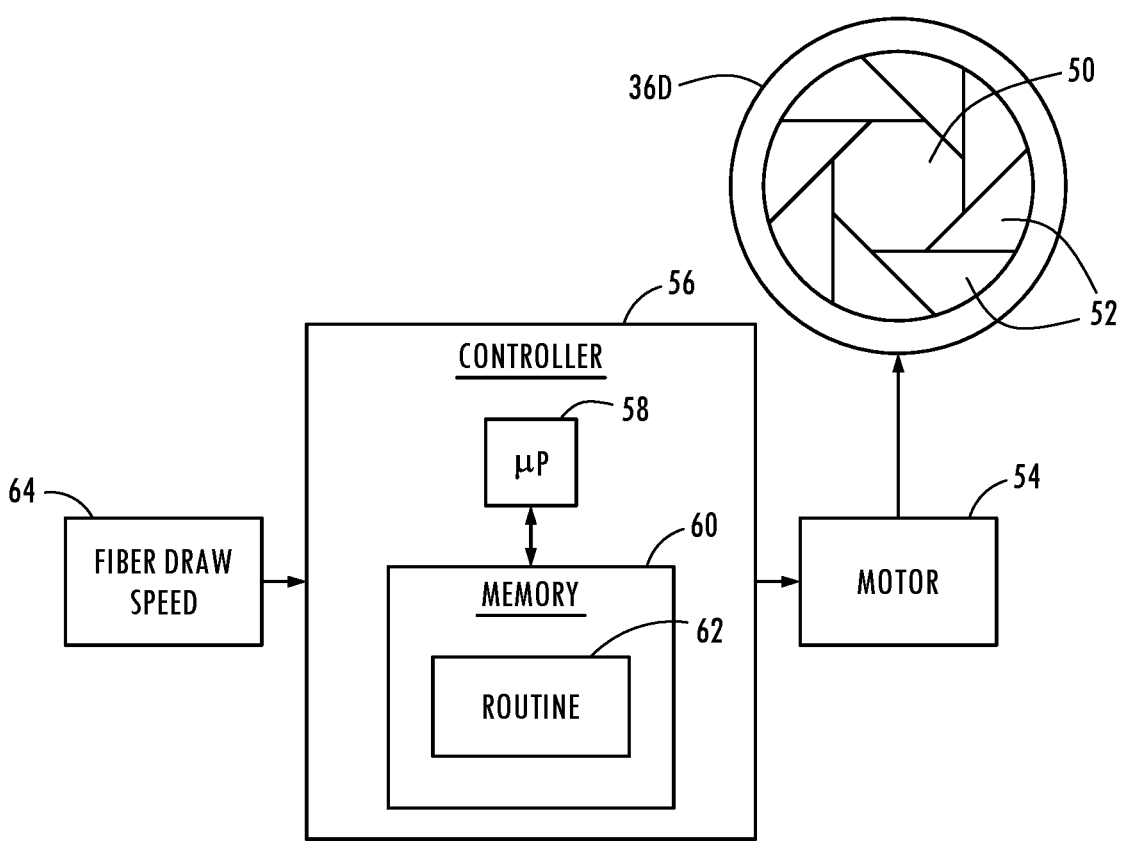
FIG. 4 is a top view of an adjustable outlet nozzle for controlling the opening size for use at different fiber draw speeds, according to another embodiment.

Referring to FIG. 4, an adjustable outlet nozzle 36D is illustrated having an adjustable size opening 50 for controlling the effective size of the furnace outlet 34 and hence the air flow therethrough. The adjustable nozzle 36 may be configured as an iris nozzle, according to one example, having a plurality of moveable members such as offset panels 52 that may be controllably moved to adjust the size of the opening 50 which may have an approximate cylindrical shape. Panels 52 may be moved with an actuator, such as an electric motor 54 that is controlled by a controller 56. The controller 56 may include control circuitry, such as a microprocessor 58 and memory 60 configured to execute one or more routines or algorithms. It should be appreciated that other analog and/or digital circuitry may be employed to control the adjustable outlet nozzle. The controller 56 is shown receiving the fiber draw speed 64 as an input and controlling the motor 54 to control the size of the opening 50 of the adjustable nozzle 36D based on the draw speed. As such, the size of the opening 50 of the adjustable nozzle 36D may be adjusted by the controller 56 in advance and on the fly to accommodate various draw speeds of the optical fiber 15. The adjustable outlet nozzle 36D may be adjusted in size to provide a plurality of opening sizes having approximately circular diameters such as in the range of about 5 to 10 mm, and more preferably in the range of about 5 to 8 mm. This may allow for draw speeds of 50 m/s to 100 m/s.

Figure 5:
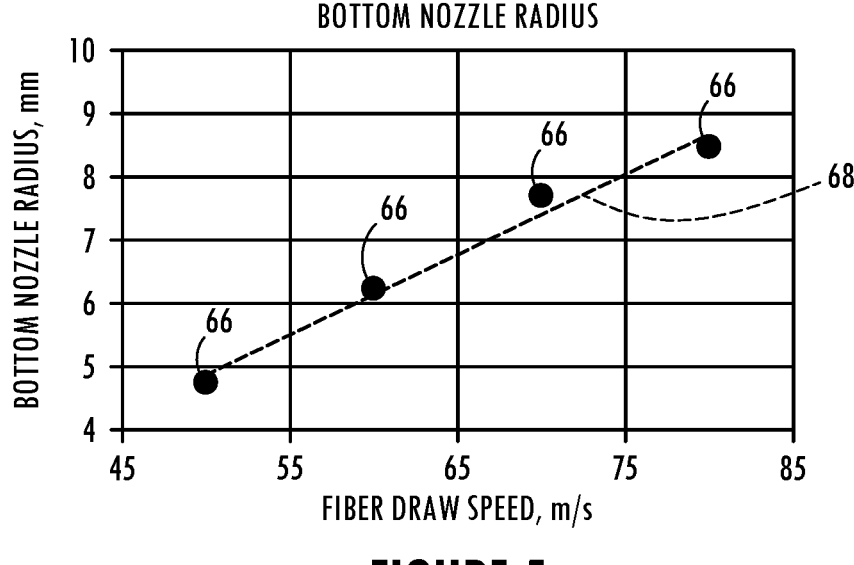
FIG. 5 is a graph illustrating the adjustable outlet nozzle effective size adjusted as a function of fiber draw speed, according to one example.

The routine 62 may be executed by the control circuitry and may be configured to adjust the size of the outlet nozzle as shown in FIG. 5, according to one example. In this example, the nozzle opening radius size is shown at select points 66 set as a function of the optical fiber draw speed. As the optical fiber draw speed increases, the size of the opening 50 of the outlet nozzle 36 likewise increases. As the fiber draw speed decreases, the size of the opening 50 of the outlet nozzle 36 likewise decreases. It should be appreciated that further adjustments to the outlet nozzle opening size may be made based on fiber draw speed as shown by line 68 which linearly connects each of the set points 66.

The optical fiber production system 10 advantageously employs the adjustable nozzle located proximate to the furnace outlet in which the adjustable nozzle has an exit opening size adjusted based on draw speed of the optical fiber. The optical fiber production system allows for a method of manufacturing optical fiber. The method of manufacturing optical fiber may include drawing the optical fiber from an optical preform in the draw furnace and along the draw pathway and treating the optical fiber in a slow cooling device, such as an annealing furnace, positioned along the draw pathway. The annealing furnace includes an inlet, an outlet, and a process tube extending between the inlet and the outlet. The method further includes selecting an exit opening size of a nozzle operatively coupled to the outlet based on the draw speed of the optical fiber.

The step of selecting the exit opening size of the nozzle may include adjusting the exit opening size of the nozzle with an actuator. The actuator may be controlled by a controller based on the draw speed of the optical fiber.

The step of selecting the exit opening size of the nozzle may include selecting one of a plurality of nozzles based on the draw speed of the optical fiber.

Accordingly, the optical fiber production system and method of manufacturing optical fiber advantageously allows for the manufacture of optical fiber at varying draw speeds. In particular, the method may produce optical fiber at a low speed with a first size opening of the outlet nozzle and may be selected or adjusted to produce optical fiber at a high speed with an enlarged opening size of the outlet nozzle. This advantageously prevents the buildup and periodic plugging of the outlet caused by the boundary layer and vibration that may otherwise occur.

Various modifications and alterations may be made to the examples within the scope of the claims, and aspects of the different examples may be combined in different ways to achieve further examples. Accordingly, the true scope of the claims is to be understood from the entirety of the present disclosure in view of, but not limited to, the embodiments described herein.

It will be apparent to those skilled in the art that various modifications and variations can be made without departing from the spirit or scope of the claims.

What is claimed is:

1. A method of manufacturing optical fiber in an optical fiber production system, the method comprising:

providing a draw furnace operatively coupled to a slow cooling device along a draw pathway;

drawing the optical fiber from an optical fiber preform in the draw furnace and along the draw pathway in a draw direction;

heat treating the optical fiber in the slow cooling device positioned along the draw pathway, the slow cooling device comprising an inlet, an outlet, and a process tube extending between the inlet and the outlet, wherein the optical fiber induces a gas boundary layer extending outward from the optical fiber and moving in the draw direction; and adjusting an opening size of an outlet nozzle operatively coupled to the outlet with an actuator based on a draw speed of the optical fiber, wherein the opening size of the outlet nozzle is selected to have a first opening size at a first draw speed and a second opening size that is greater than the first opening size at a second draw speed that is greater than the first draw speed, and wherein the induced gas boundary layer is larger at the second draw speed compared to the first draw speed.

2. The method of claim 1, wherein the actuator is controlled by a controller.

3. The method of claim 1, wherein the step of adjusting the opening size of the outlet nozzle comprises selecting one of a plurality of outlet nozzle sizes based on the draw speed.

4. The method of claim 1, wherein the process tube comprises a process tube wall and a plurality of heating zones, each heating zone comprising at least one heating element.

5. The method of claim 1, further comprising the step of inducing gas flow from a gas distribution assembly fluidly coupled to the outlet of the slow cooling device into the process tube of the slow cooling device, such that gas flows within the process tube in an upward direction.

6. The method of claim 5, wherein the optical fiber is drawn within the process tube in a draw direction that is opposite the upward direction and wherein the optical fiber translating within the process tube induces a gas boundary layer extending radially outward from the optical fiber in the draw direction.

7. The method of claim 6, wherein the outlet nozzle is located in the gas distribution assembly.

8. The method of claim 1, wherein the slow cooling device comprises an annealing furnace.

9. The method of claim 1, further comprising the step of coating the optical fiber after the step of heat treating the optical fiber.

10. The method of claim 1, further comprising the step of collecting the optical fiber with a fiber collection unit.

11. The method of claim 1, further comprising the steps of:

detecting a change in the draw speed of the optical fiber; and selecting a different opening size of the outlet nozzle based on the change in the draw speed of the optical fiber.

12. The method of claim 11, further comprising the step of adjusting the opening size of the outlet nozzle to the selected different opening size.

13. An optical fiber production system comprising:

a draw furnace configured to draw an optical fiber from an optical preform along a draw pathway extending from the draw furnace, in a draw direction;

a slow cooling device positioned along the draw pathway, wherein the slow cooling device comprises:

an inlet;

an outlet; and a process tube extending between the inlet and the outlet;

an adjustable outlet nozzle located proximate to the outlet, wherein the adjustable outlet nozzle has an outlet opening size configured to be adjusted based on draw speed of the optical fiber, wherein the outlet opening size of the adjustable outlet nozzle is selected to have a first opening size at a first draw speed and a second opening size that is greater than the first opening size at a second draw speed that is greater than the first draw speed;

a fiber collection unit positioned along the draw pathway; and a gas distribution assembly positioned along the draw pathway and fluidly coupled to the outlet and structurally configured to induce gas flow from the gas distribution assembly into the process tube such that gas flows within the process tube in an upward direction, wherein the slow cooling device is positioned between the draw furnace and the gas distribution assembly, wherein the optical fiber drawn through the process tube induces a gas boundary layer extending outward from the optical fiber and moving in the draw direction, and wherein the induced gas boundary layer is larger at the second draw speed compared to the first draw speed.

14. The optical fiber production system of claim 13, further comprising:

an actuator; and a controller for controlling the actuator to adjust the size of the opening of the adjustable outlet nozzle.

15. The optical fiber production system of claim 13, wherein the outlet nozzle comprises one of a plurality of outlet nozzles each having an opening size selected based on the draw speed of the optical fiber.

16. The optical fiber production system of claim 13, wherein the process tube comprises a process tube wall and a plurality of heating zones, each heating zone comprising at least one heating element.

17. The optical fiber production system of claim 13, wherein the adjustable outlet nozzle is located within the gas distribution assembly.

18. The optical fiber production system of claim 13, wherein the slow cooling device comprises an annealing furnace.

\* \* \* \* \*